US008459673B2

(12) United States Patent
Tempelman et al.

(10) Patent No.: US 8,459,673 B2
(45) Date of Patent: Jun. 11, 2013

(54) TRACK ROD

(75) Inventors: Herrebertus E. J. Tempelman, Paris (CA); Ihab Ragai, Guelph (CA); Paul R. Bigoney, Newport, NH (US)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 104 days.

(21) Appl. No.: 12/920,712

(22) PCT Filed: Jan. 29, 2010

(86) PCT No.: PCT/US2010/022520
§ 371 (c)(1),
(2), (4) Date: Sep. 2, 2010

(87) PCT Pub. No.: WO2010/088471
PCT Pub. Date: Aug. 5, 2010

(65) Prior Publication Data
US 2011/0272908 A1 Nov. 10, 2011

Related U.S. Application Data

(60) Provisional application No. 61/148,169, filed on Jan. 29, 2009.

(51) Int. Cl.
*B60G 9/02* (2006.01)
(52) U.S. Cl.
USPC ....... 280/124.111; 280/124.156; 280/124.177
(58) Field of Classification Search
USPC ....... 280/124.106, 124.107, 124.11, 124.111, 280/124.152, 124.156, 124.164, 124.166, 280/124.177
See application file for complete search history.

(56) References Cited

U.S. PATENT DOCUMENTS

| | | | | |
|---|---|---|---|---|
| 3,162,463 | A | | 9/1961 | Schmitz |
| 3,231,040 | A | * | 1/1966 | Blanchette ................ 280/86.75 |
| 3,410,575 | A | * | 11/1968 | Turnbull et al. ........... 280/86.75 |
| 3,869,015 | A | * | 3/1975 | Allison ........................ 180/352 |
| 3,901,344 | A | | 8/1975 | Adams |
| 3,909,036 | A | | 9/1975 | Pound |
| 4,053,171 | A | * | 10/1977 | Hyler .................... 280/124.116 |
| 4,973,077 | A | * | 11/1990 | Kuwayama et al. ... 280/124.107 |

(Continued)

OTHER PUBLICATIONS

International Search Report PCT/US2010/022520, published Aug. 5, 2010.

(Continued)

*Primary Examiner* — Faye M Fleming
*Assistant Examiner* — Barry Gooden, Jr.
(74) *Attorney, Agent, or Firm* — Tarolli, Sundheim, Covell & Tummino LLP

(57) ABSTRACT

A track rod for laterally locating an axle assembly with respect to a vehicle frame. The disclosed track rod is especially useful for large off highway vehicles. The track rod includes a first end piece pivotally connected to a vehicle structure such as a frame and a second end piece pivotally connected to a vehicle axle, one of the end pieces includes a housing having a fixed, force-receiving member The housing is adapted to receive a first elastomenc member located in a juxtaposed position with respect to one side of the fixed member A floating plate slidably received in the housing is located in a juxtaposed position with respect to the first elastomenc member The other end piece includes a portion receivable by the housing. A second elastomenc member is positioned between the end piece portion and the fixed member.

15 Claims, 5 Drawing Sheets

U.S. PATENT DOCUMENTS

| | | | |
|---|---|---|---|
| 6,357,768 B1 * | 3/2002 | Chan et al. ............ | 280/124.106 |
| 6,428,027 B1 | 8/2002 | Stuart | |
| 6,641,152 B1 * | 11/2003 | Suzuki ................... | 280/124.112 |
| 6,758,294 B2 * | 7/2004 | Peddycord et al. ........ | 180/89.12 |
| 6,805,215 B2 * | 10/2004 | Puterbaugh ............... | 180/89.13 |
| 6,866,276 B2 * | 3/2005 | Carlstedt et al. ....... | 280/124.107 |
| 7,641,208 B1 * | 1/2010 | Barron et al. ......... | 280/124.106 |
| 7,648,149 B2 * | 1/2010 | Ryberg et al. .......... | 280/124.106 |
| 7,959,172 B2 * | 6/2011 | Nashawaty et al. .... | 280/124.156 |
| 2002/0130481 A1 * | 9/2002 | Fader et al. ............ | 280/124.137 |
| 2006/0049600 A1 * | 3/2006 | Dudding et al. ......... | 280/124.11 |
| 2006/0255557 A1 * | 11/2006 | Hass et al. ............. | 280/124.116 |
| 2007/0085294 A1 * | 4/2007 | Lee ........................ | 280/124.107 |
| 2008/0023929 A1 * | 1/2008 | Ryberg et al. .......... | 280/124.107 |
| 2009/0115153 A1 * | 5/2009 | Guhman ................... | 280/124.11 |
| 2011/0315468 A1 * | 12/2011 | Sellars et al. ................. | 180/350 |

OTHER PUBLICATIONS

PCT/US2010/022520 International Search Report and Written Opinion; date of mailing Mar. 23, 2010.

* cited by examiner

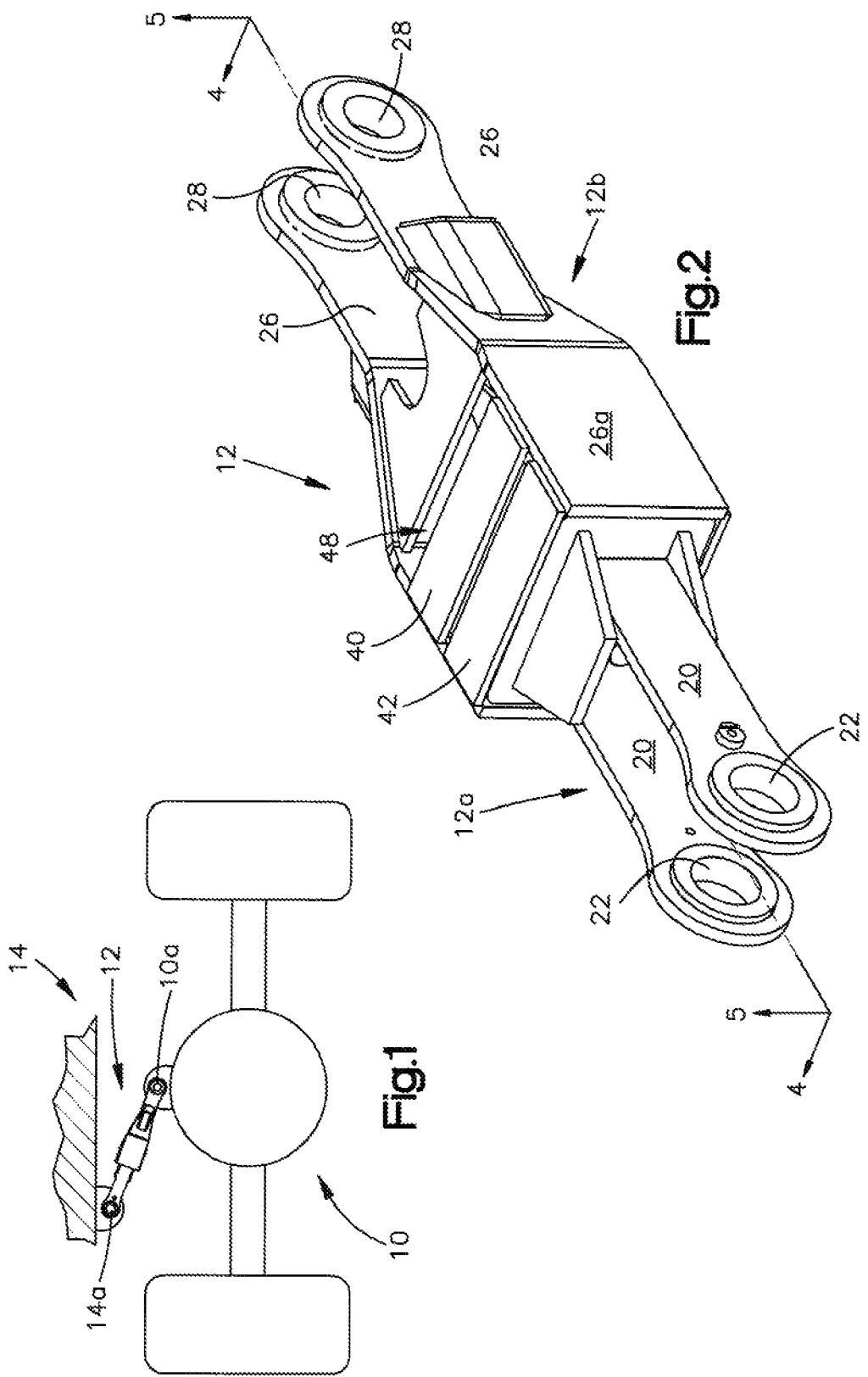

TRACK ROD

TECHNICAL FIELD

The present invention relates generally to suspensions and, in particular, to a new and improved track rod.

BACKGROUND ART

Track rods, also termed torque arms and panhard rods, are used in vehicles to laterally locate an axle assembly. in general, a track rod includes one end pivotally connected to a frame or chassis. The track rod extends laterally for a predetermined length and has its other end pivotally connected to an axle housing. The track rod inhibits relative lateral movement between the axle and the frame or chassis of a vehicle. Other suspension components such as struts or radius arms, longitudinally locate the axle with respect to the vehicle frame.

When a vehicle such as a mining truck is operated on rough terrain, substantial road-induced shocks can be transmitted to the track rod by the axle housing. These shocks, in turn, are transmitted to the vehicle frame. it has been found that with existing track rods, these road-induced shocks can eventually cause failure in the track rod and/or the mounting points on the frame and axle housing to which the track rod is attached.

DISCLOSURE OF INVENTION

The present invention provides a new and improved track rod which is capable of buffering shocks imparted to the axle housing by rough terrain such as unpaved roads used in mines. The track rod includes elastomeric members which are arranged to receive and absorb/dampen compressive forces when the track rod is placed in either compression or tension due to a road shock. With the disclosed invention, the potential for damage to the track rod and/or its mounting points on the vehicle and axle due to road shocks, etc. are reduced.

According to the invention, a track rod and a method for locating a vehicle axle is provided that includes a first end piece operatively coupled to a vehicle frame and a second end piece operatively coupled to a vehicle axle. At least one of the end pieces includes a housing that has a fixed, force receiving member. The housing is adapted to receive a first elastomeric member that is located in a force applying position with respect to one side of the fixed member. The other end piece includes a force applying portion that is receivable by the housing. A second elastomeric member is positioned between this force applying portion and another side of the fixed member. A force transmitting member is arranged to apply forces to the first elastomeric member when the end pieces move away from each other, When the end pieces move toward each other, the portion of the first end piece applies forces to the second elastomeric member.

In a more preferred embodiment, a floating plate is slidably received in the housing and is located in a force applying position with respect to the first elastomeric member. In its more preferred embodiment, the force transmitting member comprises a clamping element preferably in the form of a bolt and nut that extends through the end piece portion, the first and second elastomeric members, the fixed force receiving member and the floating plate.

According to a feature of a preferred embodiment, the track rod also includes a bushing assembly which permits relative movement between the first and second end pieces but establishes a fixed stop to limit the extent to which the end pieces can move towards each other. In a more preferred embodiment, the bushing assembly comprises a pair of interfitting bushings, one of which has an end that is engageable with one side of the fixed force receiving member and the other of which has an end which is engageable with the other side of said fixed force receiving member.

The method disclosed for locating the vehicle axle with respect to a vehicle frame buffers the shock loads between the vehicle and axle in two directions. When the shock load is due to forces tending to move the axial away from the frame, (which places the track rod in tension), the shock related force is buffered by one of the elastomeric members. When the shock load is due to a force tending to move the axle towards the vehicle frame, this force is buffered by the other elastomeric member. This is achieved by providing a force transmitting/coupling member arranged to apply compression forces to one elastomeric member when the track rod is placed in tension and to apply compression forces to the other elastomeric member when the track rod is placed in compression.

In one disclosed embodiment, the end pieces and/or housing are a weldments and may be in a rectangular or square configuration. The invention also contemplates end pieces and/or housing that are castings. In addition, the elastomeric member and housing may be constructed in an annular configuration.

Additional features of the invention will become apparent and a fuller understanding obtained by reading the followed detailed description made in connection with the accompanying drawings.

BRIEF DESCRIPTION OF DRAWINGS

FIG. 1 is a schematic representation of a vehicle axle and a track rod extending from the axle to a frame member;

FIG. 2 is a perspective view of a track rod constructed in accordance with the present invention;

DETAILED DESCRIPTION

Figure 3:
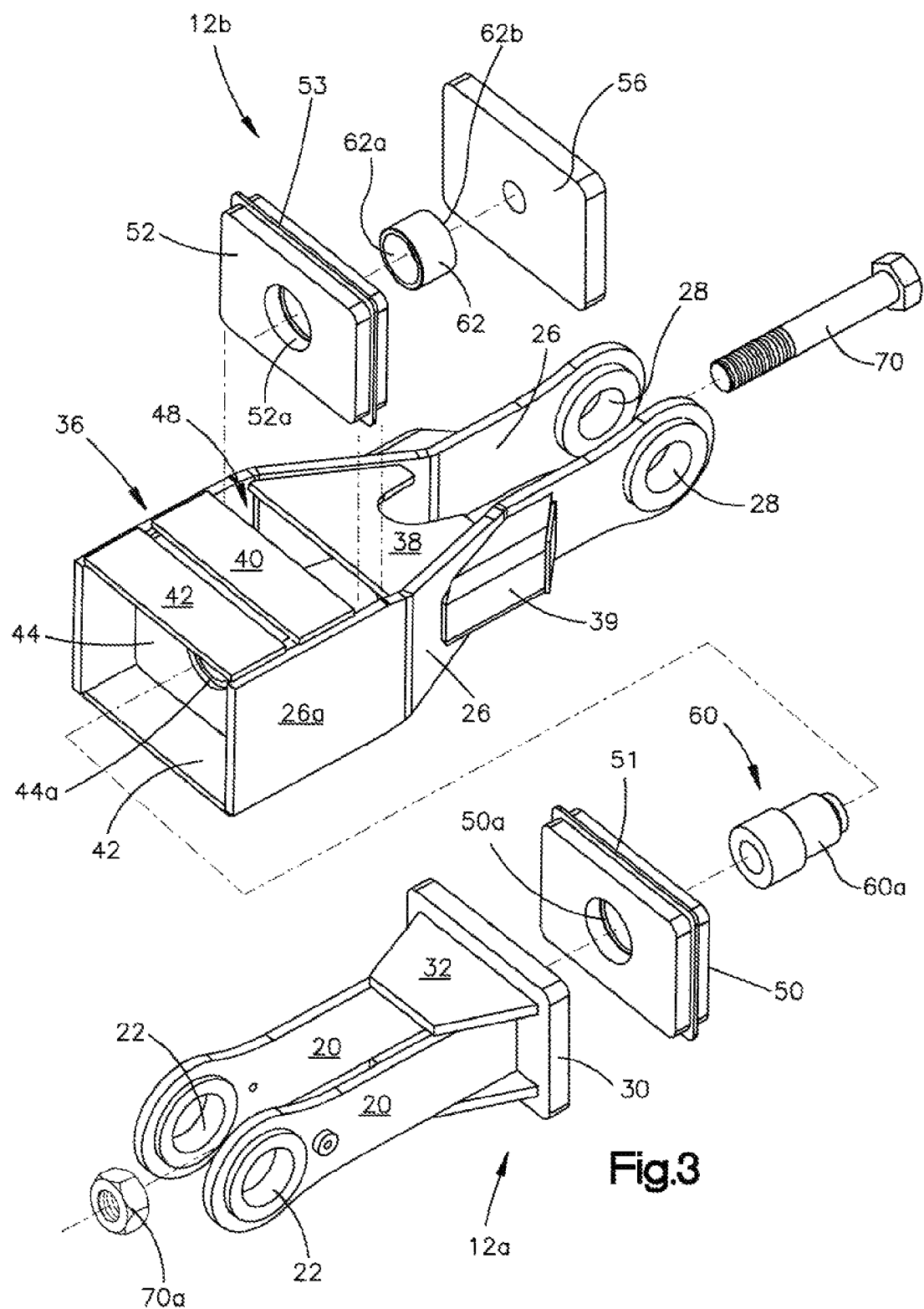
FIG. 3 is an exploded view of the track rod shown in FIG. 2.

FIG. 1 schematically illustrates an axle assembly 10 and a track rod 12 that laterally couples the axle assembly to a vehicle frame 14. A track rod, which is also referred to as a torque arm or panhard rod in some applications, laterally locates the axle assembly 10 and inhibits side-to-side movement of the axle assembly with respect to the vehicle frame 14.

The track rod 12 of the present invention is disclosed in connection with heavy duty, off highway equipment such as mining trucks. It should be understood, however, that the principles of the invention can be applied to track rods, torque rods and panhard rods used in other vehicle applications.

As seen in FIG. 1, the track rod 12 is pivotally pinned to the axle housing 10 and the frame member 14. In particular, one end of the track rod is pinned or otherwise operatively coupled to a lug 14a forming part of the vehicle frame and the opposite end of the track rod is pinned or coupled to a lug 10a forming part of the axle assembly 10.

As seen best in FIG. 2, one end of the track rod includes a pair of parallel, extending arms 20, each having an associated mounting hole 22. In the illustrated embodiment, a lug, for example the lug 14a, is received between the arms 20 and includes a mounting hole (not shown), which is aligned with the holes 22. A suitable pin member or bolt is passed through the aligned holes, thereby securing the arms 20 to the lug 14a.

The opposite end of the track rod 12 also includes a pair of extending arms 26, each including an associated hole 28. According to the example, the lug 10a is received between the arms 26 and includes an associated hole (not shown). The mounting hole is aligned with the holes 28 and as explained above, a suitable pin member or bolt is received in the aligned holes and secures the end of the track rod 12 to the lug 10a.

Turning now to FIG. 3, the arms 20 form part of a first end piece indicated generally by the reference character 12a. The arms 26 form part of a second end piece/housing 12b. During vehicle operation and as will be explained, the end pieces 12a, 12b can move relative to each other in response to road-induced shocks as the axle 12 traverses the terrain.

Figure 4:
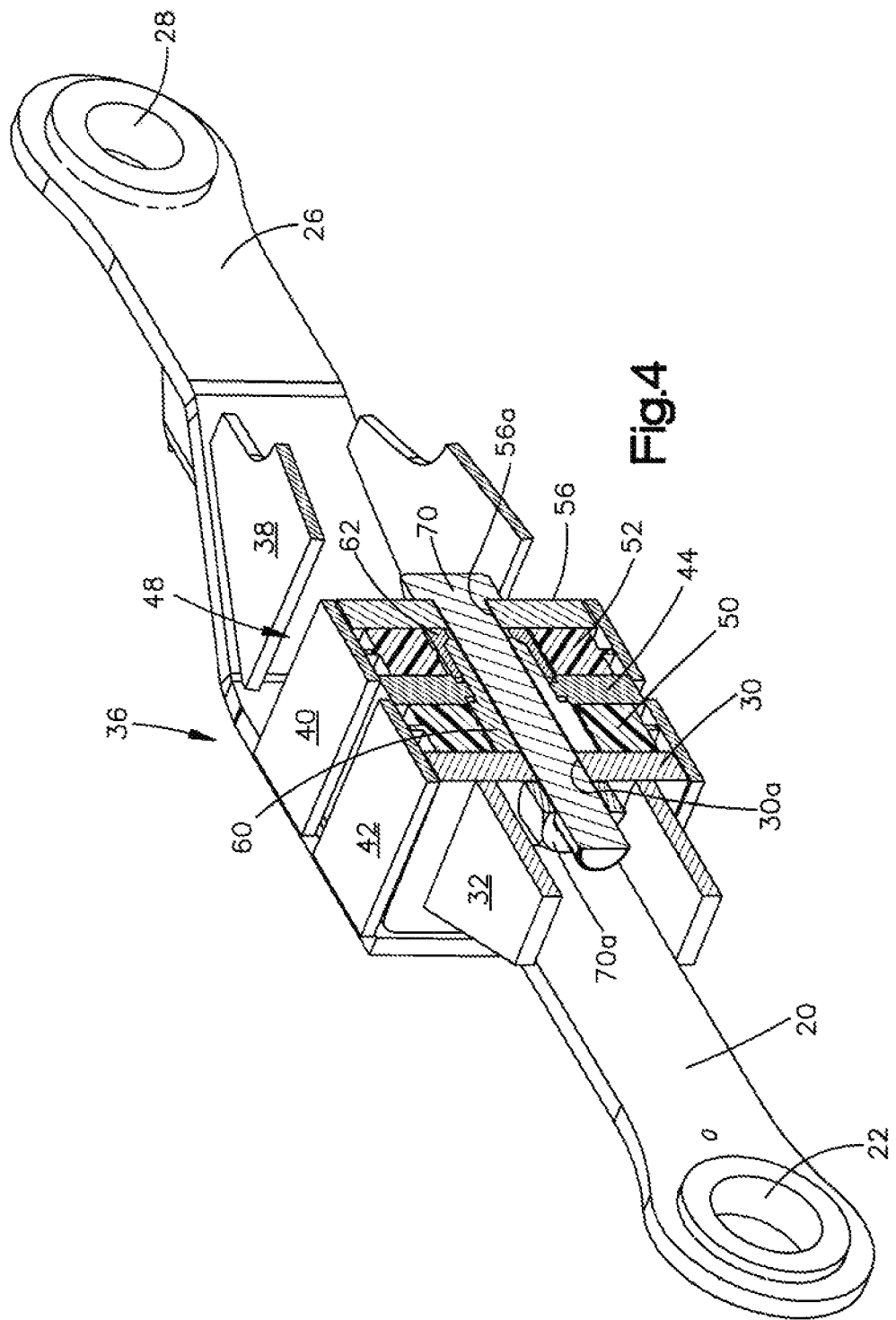
FIG. 4 is a sectional view of the track rod as seen from the plane indicated by the line 4-4 in FIG. 2.
Figure 5:
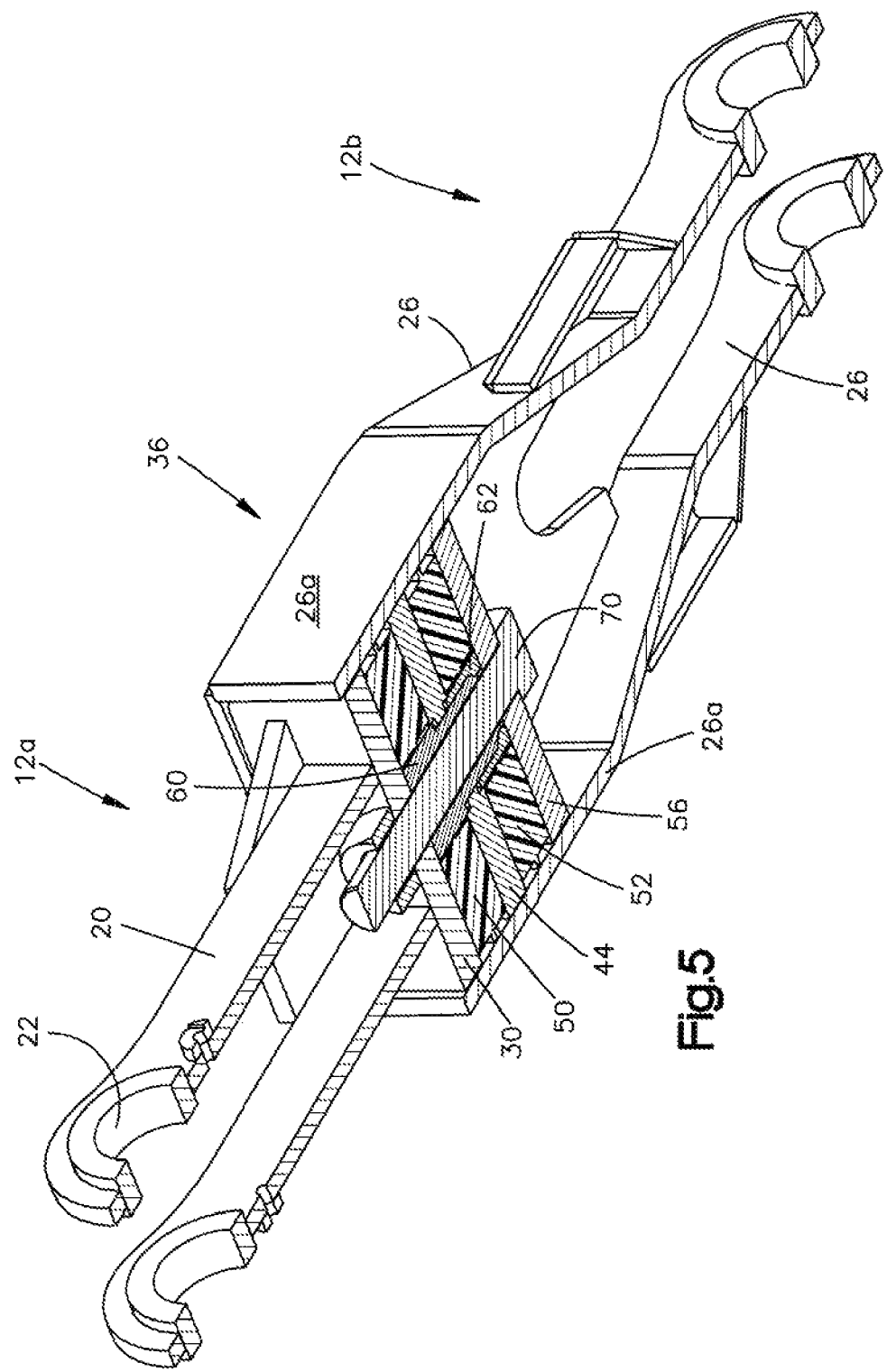
FIG. 5 is a sectional view of the track rod as seen from the plane indicated by the line 5-5 in FIG. 2.

Referring also to FIG. 4, the track rod 12 includes at least two elastomeric members to be described, which permit controlled, relative movement between the end pieces 12a, 12b. The end piece 12a includes a rigid plate member 30 to which the arms 20 are suitably attached, as by welding. A pair of gusset plates 32 is welded to the plate member 30 and arms 20 to rigidize the connection between the plate member 30 and the arms 20.

The end piece 12b includes a housing indicated generally by the reference character 36 that is partially formed by plate extensions 26a of the arms 26. Gusset plates 38, 39 reinforce and rigidize the arms 26. Pairs of upper and lower cover plates 40, 42 extend between and are welded to the arm extensions 26a and also partially define the housing 36.

Referring also to FIG. 4, an intermediate plate member 44 is rigidly fastened within the housing 36. A gap 48 between the cover plate 40 and the gusset 38 provides access to the inside of the housing 36.

A first elastomeric plate-like member 50 is received in the housing 36 and, after assembly, abuts the left side (as viewed in FIG. 4) of the intermediate plate member 44 A second elastomeric plate member 52 is installed through the opening 48 and abuts the opposite side of the intermediate plate member 44. A sliding or floating plate member 56, also installed through the opening 48, abuts the second elastomeric member 52, as seen best in FIG. 4.

The first and second elastomeric members 50, 52, the plate members 30,56 and the intermediate plate member 44 include associated holes 50a. 52a, 30a, 56a, 44a, respectively. When assembled, the holes are aligned. As seen in FIG. 4, the first elastomeric member 50 receives a bushing 60 that includes a smaller diameter portion 60a that extends through the hole 44a in the intermediate plate 44. A smaller bushing 62, having an inside diameter that corresponds to the reduced diameter portion 60a of the first bushing 60, is sized to be received by the hole 52a in the second elastomeric member 52 and has an inside bore 62a that receives the narrow diameter portion 60a of the first bushing 60. The smaller bushing 62 also includes an inside shoulder 62b which, as will be explained, serves as a stop.

Figure 6:
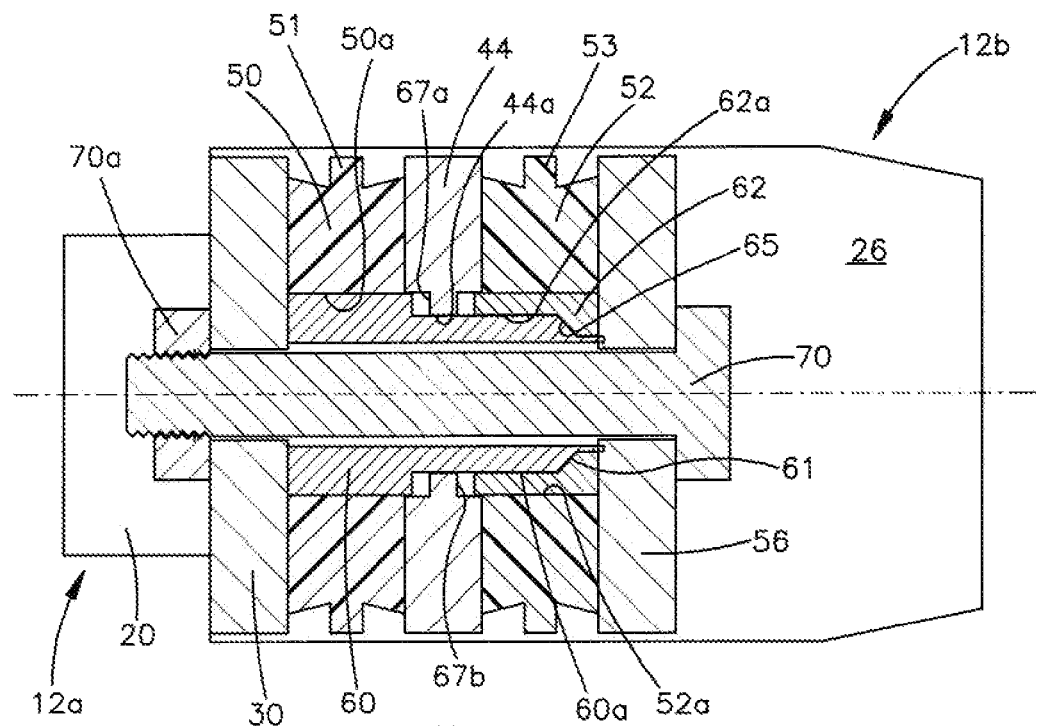
FIG. 6 is a fragmentary sectional view of the track rod shown in a preloaded conditon.

As seen best in FIG. 6, the components are held together by a through bolt 70 which extends through the hole 56a formed in the sliding plate member 56, the bore defined by the first bushing 60 and the bore 30a in the rigid plate member 30. The through bolt 70 extends through the rigid plate member 30 forming part of the first end piece 12a and is adapted to receive a securement fastener such as a nut 70a and washer (not shown) to maintain the assemblage. It should be apparent from FIG. 4, that once the bolt 70 is installed, the end pieces 12a, 12b are clamped together.

With the disclosed construction, the first elastomeric member 50 is clamped between the intermediate plate 44 (forming first part of the housing 36) and the rigid end plate 30 forming part of the first end piece 12a. The second elastomeric plate member 52 is clamped between the intermediate plate 44 and the floating plate 56. According to a preferred embodiment, the elastomeric members 50, 52 are preloaded during assembly. This is achieved by the configuration of the first and second bushings 60, 62. In particular, the clamping bolt 70 is tightened until the shoulder 62b of the smaller or second bushing 62 abuts the end of the first bushing 60. Once the bushings abut, no further movement is permitted between the end plate 30 and the intermediate plate 44 and between the floating plate 56 and the intermediate plate 44. The bushings are sized so that the elastomeric members are compressed a predetermined amount when the bushing 60, 62 abut each other.

FIG. 6 illustrates a position of the track rod components after the track rod has been preloaded. As indicated above, after preloading, the bushing 60, 62 abut each other and relative axial movement, toward each other, is inhibited. In particular, the reduced diameter section 60a includes an external stop surface 61, which, in the illustrated embodiment, is an angled or chamfered surface. The bushing 62, which includes a bore segment 63 adapted to slidably receive the reduced diameter portion 60a of the bushing 60, has an outside diameter that is the same or substantially similar to the outside diameter of the larger diameter portion of the bushing 60. The bushing 62 includes the inside shoulder 62b that defines a stop surface 65 which is abutably engageable with the stop surface 61 defined by the bushing 60, The intermediate plate 44, which is fixed in the housing 36, includes counter bores 67a, 67b that define circular recesses on either side of the bore 44a. The circular recesses 67a, 67b have a diameter that corresponds to the outer diameters of the bushing 60 and the bushing 62.

According to a feature of the invention, the circular recesses allow the bushings 60, 62 to move relative to the fixed intermediate plate 44 when forces are applied to the track rod during vehicle operation.

As discussed above, the elastomeric members 50, 52 are preloaded during assembly, The extent of preload is determined by the stop surfaces 61, 65 defined by the bushing 60, 62. As should be apparent from FIG. 6, the bolt 70 and associated nut 70a are tightened in order to move the plate 30 (which forms part of the end piece 12a) and the floating plate 56 towards each other. Once the stop surfaces 61, 65 engage, no further relative movement between the plates 30, 56 are permitted. The amount of preload for the elastomeric members 50, 52 is determined by the total axial length defined by the bushings 60, 62 when their associated stop surfaces 61, 65 abutably engage.

Figure 7:
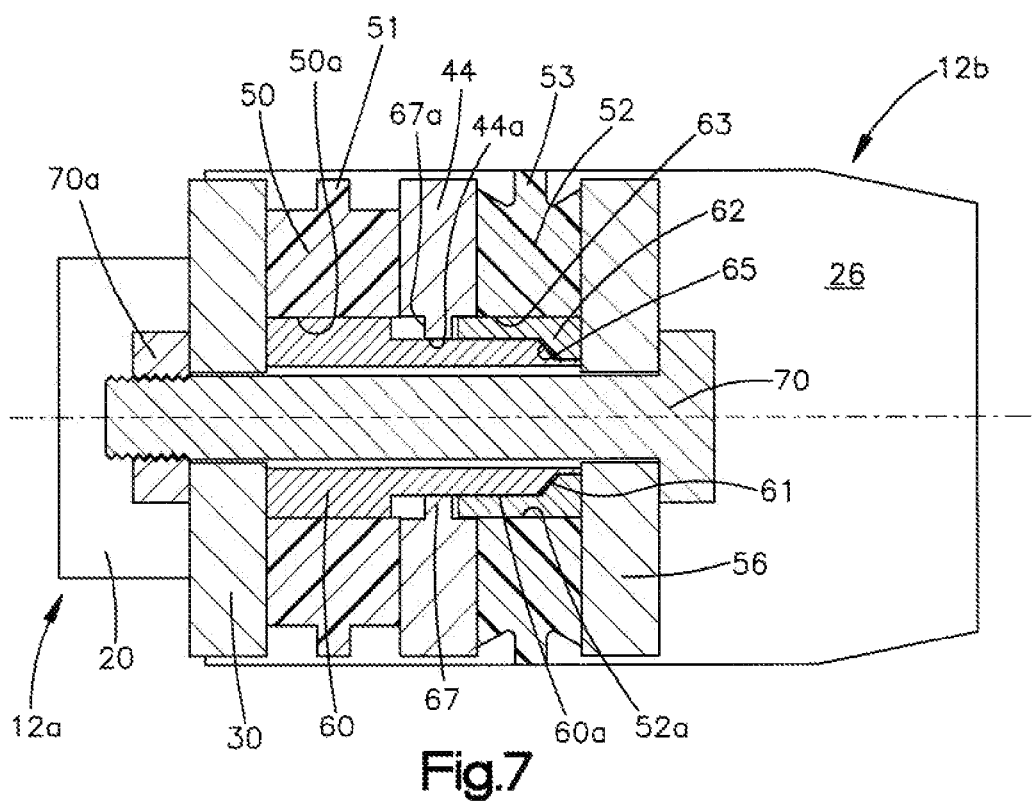
FIG. 7 is a fragmentary sectional view of the track rod shown in a tension condition.

In operation, the track rod receives tension and compression forces as the vehicle traverses the terrain. FIG. 7 illustrates positions of the components when the track rod 12 is under tension. When the track rod is placed in tension, the end pieces 12a, 12b are urged apart. As seen in FIG. 7, the plate 30 forming part of the end piece 12a tends to move away from the fixed intermediate plate 44. Since the plate 30 is locked to the floating plate 56 via the bolt 70 and bushings 60, 62, the floating plate 56 is moved towards the intermediate plate 44, placing the elastomeric member 52 under further compression. The compression force exerted on the elastomeric member 50 is correspondingly reduced. The left end of the bushing 62 (as viewed in FIG. 2) moves into the circular recess 67b defined by the fixed intermediate plate 44.

When the track rod is placed in compression, the end piece 12a moves towards the end piece 12b. In so doing, the plate 30 of the end piece 12a moves toward the intermediate plate 44, whereas the floating plate 56 moves away from the plate 44 because it is locked to the plate 30 via the bushings 60, 62 and bolt 70. This movement tends to further compress the elastomeric member 50 and the preload, compression force on the elastomeric member 52 is reduced.

According to a feature of the invention, the elastomeric members 50, 52 include peripheral flanges 51, 53, respectively. When the track rod is placed in either tension or compression, the peripheral flange of the elastomeric member being compressed may move into contact with the associated confining plates 40, 42 which serve to reduce the amount of compression that is permitted in the elastomeric member. The peripheral flanges 51, 53 also aid in maintaining alignment of the elastomeric members 50, 52 during and after installation. In particular, the peripheral flanges tend to inhibit rotation of the elastomeric members 50, 52 within the housing 36.

As should be apparent, the controlled relative movement that is permitted between the end pieces 12a, 12b reduces the shock loads applied to the rear axle and/or frame of the vehicle during vehicle operation, especially over rough terrain.

With the disclosed construction, shocks received by the track rod 12 apply only compressive forces to the elastomeric members 50, 52 even if the shock/impact places the track rod in tension. For example, if the road induced shock urges the end pieces 12a, 12b towards each other (i.e. places the track rod 12 into compression), the first elastomeric member 50 receives an increased compressive force due to the shock the first elastomeric plate member is further compressed. If the shock urges the end pieces 12a, 12b apart (i.e. places the track rod 12 into tension), the second elastomeric member 52 receives a compressive force and the second elastomeric plate member 52 is further compressed. The disclosed apparatus buffers these shocks, thereby reducing the shock loads applied to the frame 14 and the axle housing 10, thus reducing the chances of damaging either the frame mount 14a or the axle mount 10a.

According to a feature of the invention, the cover plates 40, 42 (seen best in FIG. 4) tend to confine the elastomeric members 50, 52 and thus improve the performance and reliability of the elastomeric members 50, 52 and inhibit them from being over deformed.

According to the preferred embodiment, the elastomeric members 50, 52 are made from rubber or urethane having a durometer in the range of 50 to 90. It should be understood that other types of elastomeric materials may be used and are contemplated by the present invention. Shook absorbing members 50, 52, not made of elastomeric materials, are also contemplated. For example, metal springs or Belleville washers may be used in place of the illustrated members 50, 52.

The illustrated track rod 12 is shown as a weldment. It should be understood that the first and second end pieces 12a, 12b may be formed from castings as well. In addition, the housing 36 and the associated plate and elastomeric members 30, 50, 52, 56, 44 are shown as rectangular in shape. It should be understood that circular or an annular shaped housing is also contemplated which would utilize annular plate members and elastomeric members.

Although the invention has been described with a certain degree of particularity, it should be understood that those skilled in the art can make various changes to it without departing from the spirit or scope of the invention as hereinafter claimed.

The invention claimed is:

1. A track rod for laterally locating an axle assembly with respect to a vehicle frame, comprising:
    a) a first end piece pivotally connected to a vehicle structure;
    b) a second end piece pivotally connected to a vehicle axle;
    c) one of said end pieces including a housing having a fixed, force receiving member;
    d) said housing adapted to receive a first elastomeric member located in a juxtaposed position with respect to one side of said fixed member;
    e) a floating plate slidably received in said housing located in a juxtaposed position with respect to said first elastomeric member;
    f) said other end piece including a portion receivable by said housing;
    g) a second elastomeric member positioned between said portion and said fixed, force receiving member;
    h) a damping member clamping said portion, said first and said second elastomeric members, said fixed, force receiving member and said floating plate together.

2. The apparatus of claim 1 wherein said clamping member comprises a bolt and a nut.

3. The apparatus of claim 1 wherein said housing is a casting.

4. The apparatus of claim 1 wherein said housing and said first and said second elastomeric members are annular in configuration.

5. The apparatus of claim 1 further comprising a pair of interfitting bushings which, when abuttingly engaged with each other, define a fixed spacing between said end piece portion and said floating plate.

6. The apparatus of claim 5 wherein said bushings are configured to inhibit relative movement between said end piece portion and said floating plate while permitting relative movement between the floating plate and said fixed, force receiving member in response to shock loads received by said track rod.

7. The apparatus of claim 1 wherein said housing is a weldment.

8. A track rod for laterally locating an axial assembly with respect to a vehicle frame, comprising:
    a) first end piece operatively coupled to a vehicle frame structure;
    b) second end piece operatively coupled to a vehicle axle
    c) one of said end pieces including housing having a fixed, force receiving member;
    d) said housing adapted to receive a first elastomeric member located in a force applying position with respect to one side of said fixed member;
    e) said other end piece including a force applying portion receivable by said housing;
    f) a second elastomeric member positioned between said portion and another side of said fixed, force receiving member;
    g) a force transmitting ember arranged to apply compression forces to said first elastomeric member when said end pieces move away from each other.

9. The apparatus of claim 8 wherein said force transmitting member comprises a damping element that clamps said end piece portion, said first and said second elastomeric members and said fixed, force receiving member together.

10. The apparatus of claim 8 further comprising a floating plate slidably received in said housing and located in a force applying position with respect to said first elastomeric member.

11. The apparatus of claim 10 wherein said clamping element comprises a nut and a bolt that extends through said end piece portion, said first and said second elastomeric members, said fixed, force receiving member and said floating plate and is operative to apply compressive forces to said first and said second elastomeric members.

12. The apparatus of claim 8 further comprising a bushing assembly which permits relative movement between said first and said second end pieces but establishes a fixed stop to limit an extent to which said end pieces can move towards each other.

13. The apparatus of claim 12 wherein said bushing assembly comprises a pair of interfitting bushings, one of which is engageable with said one side of said fixed, force receiving member and the other of which is engageable with said other side of said fixed, force receiving member.

14. The method of claim 12 further comprising the step of limiting an extent of movement of said end pieces toward each other.

15. A method of locating an axle with respect to a vehicle frame comprising the steps of:
   a) providing a first end piece operatively connected to said vehicle frame;
   b) providing a second end piece operatively connected to said axle;
   c) providing a housing as part of one of said end pieces, said housing including a fixed force receiving member;
   d) providing elastomeric force receiving members on either side of said fixed force receiving member;
   e) coupling said end pieces such that movement of said end pieces away from each other applies a compressive force to one of said elastomeric members and movement of said end pieces away from each other applies a compressive force to said other elastomeric member.

* * * * *